US012314932B2

United States Patent
DeLoach et al.

(10) Patent No.: US 12,314,932 B2
(45) Date of Patent: May 27, 2025

(54) HANDOFF BETWEEN APPLICATIONS ON A PAYMENT TERMINAL

(71) Applicant: Stripe, Inc., South San Francisco, CA (US)

(72) Inventors: Jack DeLoach, Denver, CO (US); Mark Fielbig, Wappingers Falls, NY (US); Nicole DeBickes, Boca Raton, FL (US); Vinay Padma, New York, NY (US); Rustem Muslimov, Mission Viejo, CA (US); Atul Bhatia, Fremont, CA (US); Shanshan Chen, Bellevue, WA (US); Michael Shafrir, Kensington, MD (US); Nate Barnett, Seattle, WA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 17/983,895

(22) Filed: Nov. 9, 2022

(65) Prior Publication Data

US 2024/0152899 A1 May 9, 2024

(51) Int. Cl.
*G06Q 20/32* (2012.01)
*G06F 9/54* (2006.01)
*G06Q 20/12* (2012.01)

(52) U.S. Cl.
CPC ........... *G06Q 20/3267* (2020.05); *G06F 9/54* (2013.01); *G06Q 20/123* (2013.01)

(58) Field of Classification Search
CPC .................................................. G06Q 20/3267
See application file for complete search history.

(56) References Cited

U.S. PATENT DOCUMENTS

| 2011/0125838 | A1* | 5/2011 | Rao ..................... G06Q 30/02 709/203 |
| 2013/0347064 | A1* | 12/2013 | Aissi ..................... G06F 21/53 726/2 |
| 2014/0177839 | A1* | 6/2014 | Wagner .................. G06F 21/60 380/259 |

(Continued)

OTHER PUBLICATIONS

An Architecture for Virtualization-Based Trusted Execution Environment on Mobile Devices (Year: 2014).*

(Continued)

*Primary Examiner* — Arunava Chakravarti
(74) *Attorney, Agent, or Firm* — Womble Bond Dickinson (US) LLP

(57) ABSTRACT

The present disclosure is directed to handling communication, including handoffs, between applications on a payment terminal. In some embodiments, a method comprises: receiving, by the first mobile application, a first request from a user to conduct a transaction via the first mobile application and transitioning control from the first mobile application to a second mobile application running on the mobile device to collect a payment for the transaction being processed by the first mobile application in response to receiving the first request to conduct a transaction. Subsequently, after processing the payment for the transaction, the method includes transitioning control back to the first mobile application from the second mobile application as part of sending an indication of results of processing the payment by the second mobile application.

18 Claims, 12 Drawing Sheets

(56) References Cited

U.S. PATENT DOCUMENTS

| | | | | |
|---|---|---|---|---|
| 2014/0317637 A1* | 10/2014 | Gadotti | ................ | G06Q 20/322 |
| | | | | 719/313 |
| 2015/0046712 A1* | 2/2015 | Korkishko | ............ | H04L 9/3234 |
| | | | | 713/170 |
| 2015/0348026 A1* | 12/2015 | Roberts | .............. | G06Q 20/3827 |
| | | | | 705/44 |
| 2017/0214530 A1* | 7/2017 | Seibel | ................... | H04L 9/3234 |
| 2017/0262828 A1* | 9/2017 | Luciani | ................ | G06Q 20/326 |
| 2019/0005229 A1* | 1/2019 | Hlaing | .................... | G06F 9/445 |

OTHER PUBLICATIONS

Building Secure Execution Environment for Mobile Platform (Year: 2011).*

* cited by examiner

HANDOFF BETWEEN APPLICATIONS ON A PAYMENT TERMINAL

BACKGROUND

Some payment processing transactions are performed using point-of-sale (POS) terminals that have card readers that allow users to accept in-person payments. Some merchants employ mobile devices (e.g., a mobile phone) and/or tablets as their POS terminals. More specifically, these merchants allow customers to pay and sign on a merchant's mobile phone or tablet to enable merchants to process payments made with credit cards, gift cards, and cash. To facilitate this operation, these mobile devices may use a combination of software, including application programming interfaces (APIs), software development kits (SDKs) and hardware readers that read credit, debit or other payment cards and perform transactions.

More specifically, to collect fees for products or services provided, a merchant will typically enter an amount to be collected in a user interface of the mobile device, the mobile device will communicate this data to a card reader, and the card reader will collect card data, such as Europay, Mastercard, Visa, etc. data collected from a credit, debit, gift card, electronic benefits, or other payment instrument provided by the customer. In order to collect the card data, a magnetic strip or an integrated circuit of the card is read by a card reader. That card data is then used by the mobile device to authorize the transaction, for example by a commerce platform, and ultimately approve and charge the fee for the merchant with banks and/or card providers.

Recently, terminals have evolved from single-purpose payment collection devices to enablers of integrated experiences that allow merchants to run their business and build meaningful customer relationships. For example, some terminals may handle POS functions as well as functions related to inventory management, loyalty programs, and customer surveys, on an all-in-one device.

SUMMARY

The present disclosure is directed to handling communication, including handoffs, between applications on a payment terminal, substantially as shown in and/or described in connection with at least one of the figures, as set forth more completely in the claims.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described.

Methods and apparatuses for provisioning applications for a payment terminal are disclosed. In some embodiments, the payment terminal comprises a mobile device that includes a reader (e.g., card reader) that is used to perform commerce transactions with payment cards. In some embodiments, the payment terminal includes point-of-sale (POS) applications that perform POS-related functions for commerce transactions with the exception of payment processing operations. In some embodiments, the payment processing operations, including payment card data capture, are performed by other applications (e.g., an SDK, a card reader application, etc.), which communicate with the POS applications using, for example, interprocess communication.

In some embodiments, prior to their deployment on the payment terminal, the POS applications are scanned and analyzed to determine if they are compliant and secure, and if so, the POS applications are cryptographically signed. Once deployed, the POS applications undergo verification to confirm that they have not been changed since being cryptographically signed. If verification indicates that the POS applications have not been changed, they may be utilized in performing commerce transactions.

In some embodiments, the POS applications are deployed to one or more payment terminals according to a deploy plan. The deploy plan can be used by merchants to control the manner in which the POS applications are deployed, including, for example, deploying only to payment terminals of a certain type or located at a certain location (e.g., a particular store or set of stores). Such control of the deployment enables a merchant to gradually rollout new or updated POS applications.

Figure 1:
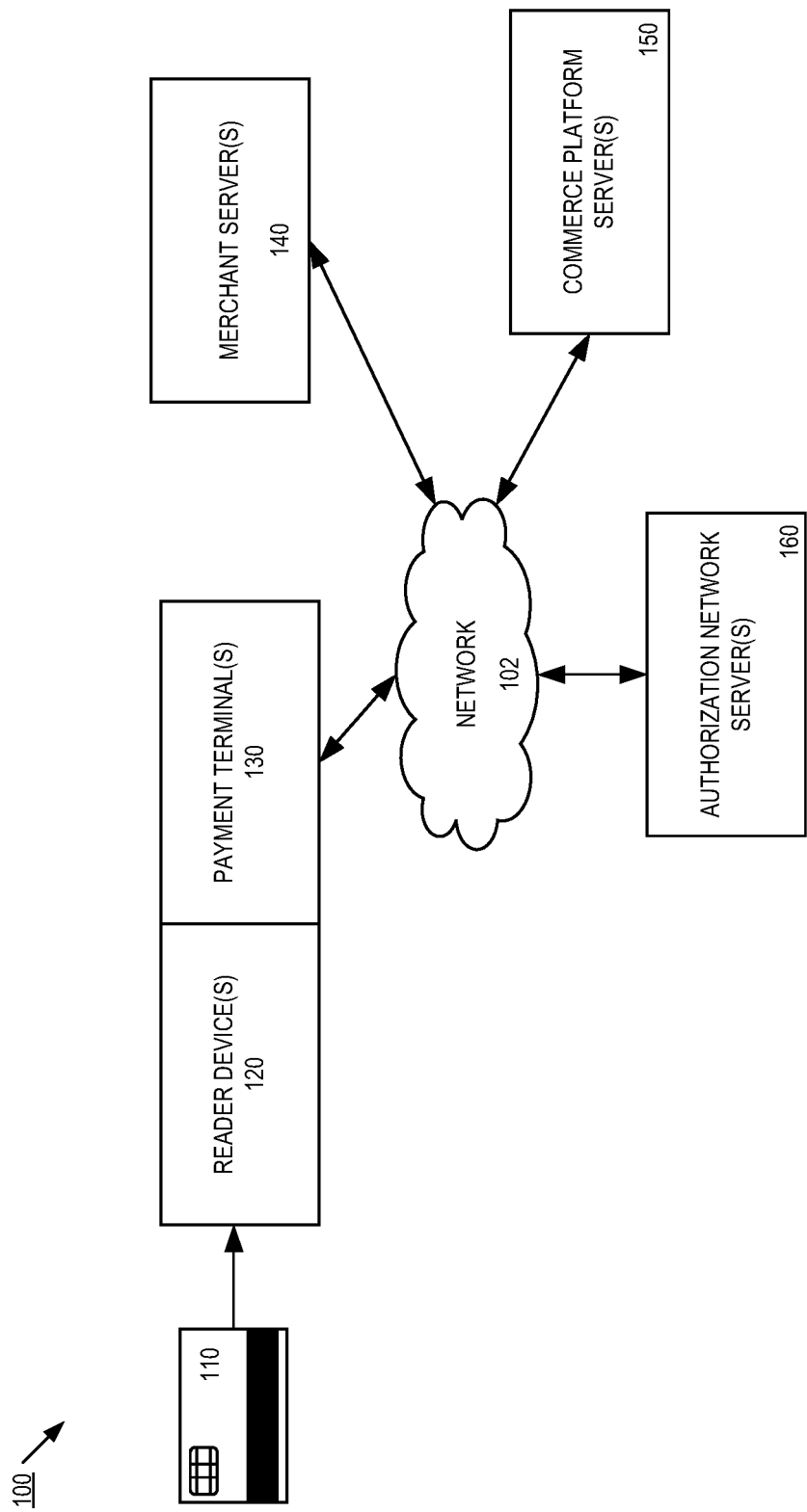
FIG. 1 is a block diagram of an exemplary system architecture for conducting transaction using payment terminal that has a reader device

FIG. 1 is a block diagram of an exemplary system architecture 100 for conducting transactions. In some embodiments, the system architecture 100 includes a payment terminal that has a reader device. The payment terminal uses the reader device when processing merchant payments with a commerce platform.

Figure 7:
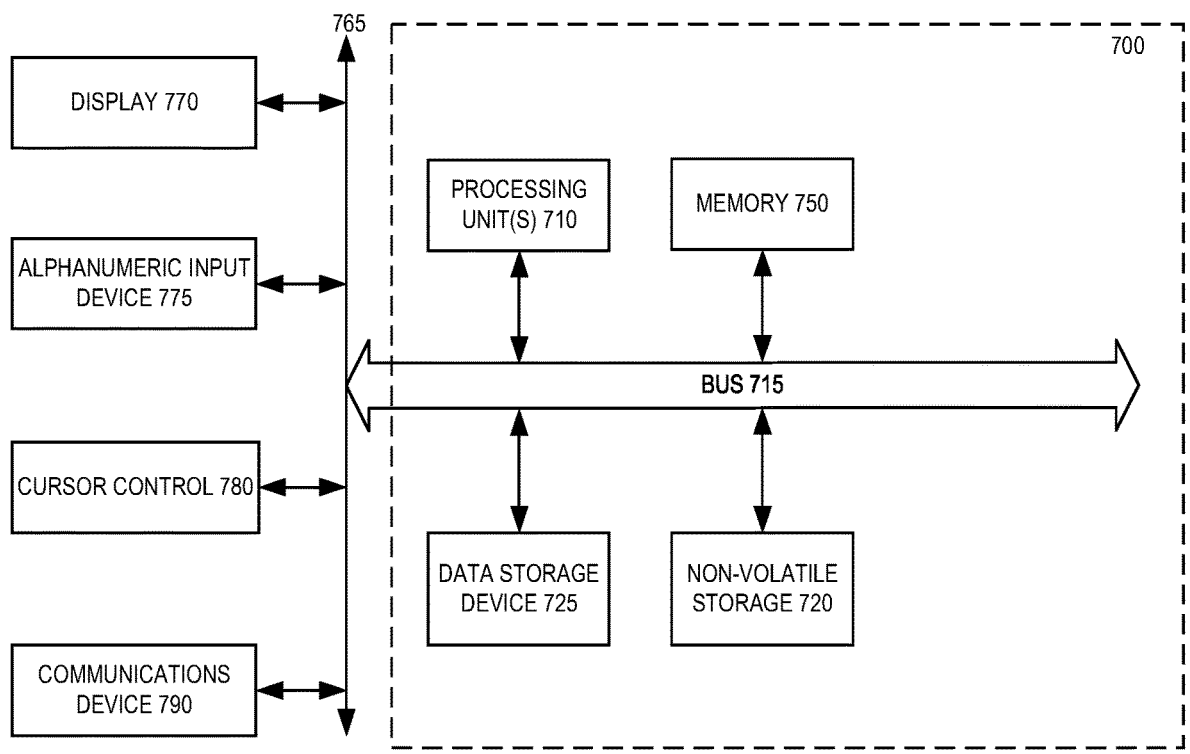
FIG. 7 is one embodiment of a computer system that may be used to support the systems and operations discussed herein.

In some embodiments, the system architecture 100 includes one or more payment terminals 130, one or more merchant servers 140, one or more commerce platform servers 150, and one or more authorization network servers 160. In some embodiments, payment terminals 130 may be computing devices, such as, for example, but not limited to, mobile devices such as, for example, a smartphone, a tablet computer, a laptop computer, or other hardware device that executes one or more applications to facilitate processing a payment for a merchant. In some embodiments, the one or more applications and/or software development kits (SDKs) facilitate an ecommerce experience, including one that enables an employee or agent of the merchant to collect payment and complete transactions for goods or services offered by the merchant, as well as take customer orders, process payments, check on inventory, enroll customers into loyalty programs and collect customer reviews. In some embodiments, each application may be a web-based application served by one or more of the merchant server(s) 140 or other computer servers at the direction of the merchant. Furthermore, the merchant server(s) 140, the authorization network server(s) 160, and the commerce platform server(s) 150 are also computing devices, such as server computers, desktop computers, etc. that include typical computing hardware, as illustrated in FIG. 7 below.

In some embodiments, payment terminal 130 includes the reader device 120. In some other embodiments, the reader device 120 is a separate device communicably coupled to payment terminal 130. In some embodiments, the reader device 120 is also a computer processing device that is communicatively coupled with payment terminal over a wireless communications link, such as, for example, but not limited to, a Bluetooth, Zigbee, or other wireless communications link. In some embodiments, the wireless communication link is secured by a secure protocol for the exchange of information, such as utilizing symmetric or asymmetric encryption-based communications. Embodiments of reader devices are illustrated and described in greater detail below in FIG. 8.

A payment processor is one example of a commerce platform. In some embodiments, the mobile reader device 800 can include a card reader 802 (e.g., an integrated circuit or smart chip reader, a magnetic strip reader, a near field communication reader, etc.), memory 806, a network interface 808 for establishing wireless communications (or wired) links, and at least one processor 804, as well as other hardware components typically associated with mobile reader devices. In some embodiments, the reader device 120 can include one or more personal identification number (PIN) pad reader devices.

Furthermore, the reader device 120 illustrated in FIG. 1 can include a mixture of different kinds of reader devices each communicatively coupled with different merchant POS devices. Furthermore, additional types of reader devices may be used instead of, or in addition to, the PIN pad reader devices and the mobile reader devices discussed herein. In some embodiments, the reader device is responsible for collecting consumer payment card data (e.g., EMV card data) by scanning a magnetic strip, reading an integrated circuit, and receiving user input, etc. from or associated with a payment card 110.

Once card data from the payment card 110 is read by a reader device 120, the card data is provided by the reader device 120 to the commerce platform server(s) 150, via payment terminal 130, for performing one or more payment processing operations. In some embodiments, these payment processing operations can include one or more of tokenizing, authorizing, and/or approving one or more financial aspects associated with the transaction. In some other embodiments, the payment terminal 130 uses one or more applications and/or a mobile software development kit (SDK) (or other application) installed and executing on a payment terminal 130 to which the mobile reader device 120 is part, and/or communicatively coupled to, in order to interact with commerce platform server(s) 150. In either embodiment, the mobile SDK directs communications between the reader device 120 and the commerce platform server(s) 150 handles any received card data in such a way that it is not exposed to any merchant system, thereby preventing merchant payment terminal 130 running an application or the merchant server(s) 140 from being subject to the scope of PCI compliance requirements. Instead, a token is generated by commerce platform server(s) 150 after authorizing a transaction with authorization network server(s) 160 (e.g., card brand systems, issuing bank systems, etc.), and the token is provided from the reader device 120 to the payment terminal 130. In some embodiments, another application executing on the payment terminal 130, such as a merchant's POS checkout application, may then use the token authorizing the transaction to complete the transaction, and further provide the token to merchant server(s) 140 for subsequent use in obtaining remuneration identified by the token by interacting with the commerce platform server(s).

Example embodiments for using reader devices with payment terminals are described in U.S. patent application Ser. No. 15/997,416, filed on Jun. 4, 2018, titled "Managed Integrated Payment Environment," the disclosure of which is incorporated by reference in its entirety. Furthermore, some embodiments of techniques and systems for tokenizing transactions using services of a commerce platform are described in U.S. Pat. No. 9,830,596, issued on Nov. 28, 2017, titled "Method for Conducting a Transaction Between a Merchant Site and a Customer's Electronic Device Without Exposing Payment Information to a Server-Side Application of the Merchant Site," the disclosure of which is incorporated by reference in its entirety.

Note that there may be multiple payment terminals, such as payment terminal 130, and reader devices, such as reader device 120, in the system architecture 100.

In some embodiments, the payment terminal 130, the reader device 120, merchant server(s) 140, commerce platform server(s) 150, and authorization network server(s) 160 can be coupled to a network 102 and communicate with one another using any of the standard protocols for the exchange of information. In some embodiments, one or more of the payment terminal 130, the reader device 120, merchant server(s) 140, commerce platform server(s) 150, and authorization network server(s) 160 can be incorporated into the same physical or logical system, or different physical or logical systems. Alternatively, one or more of the payment terminal 130, the reader device 120, merchant server(s) 140, commerce platform server(s) 150, and authorization network server(s) 160 can reside on different local area networks (LANs), wide area networks (WANs), cellular telephone networks, etc. that may be coupled together via the Internet but separated by firewalls, routers, and/or other network devices. In some embodiments, the commerce platform server(s) 150 may reside on a single server, or be distributed among different servers, coupled to other devices via a public network (e.g., the Internet) or a private network (e.g., LAN). Various other network configurations can be used including, for example, hosted configurations, distributed configurations, centralized configurations, etc. Furthermore, in some embodiments, the payment terminal 130, the reader device 120, merchant server(s) 140, commerce platform server(s) 150, and authorization network server(s) 160 can communicate with one another via network 102 using any of the protocols for the exchange of information, such as secure protocols including TLS, SSL, SSH, etc.

Handoff and Provisioning of a Payment Terminal with a Reader Device

Figure 2:
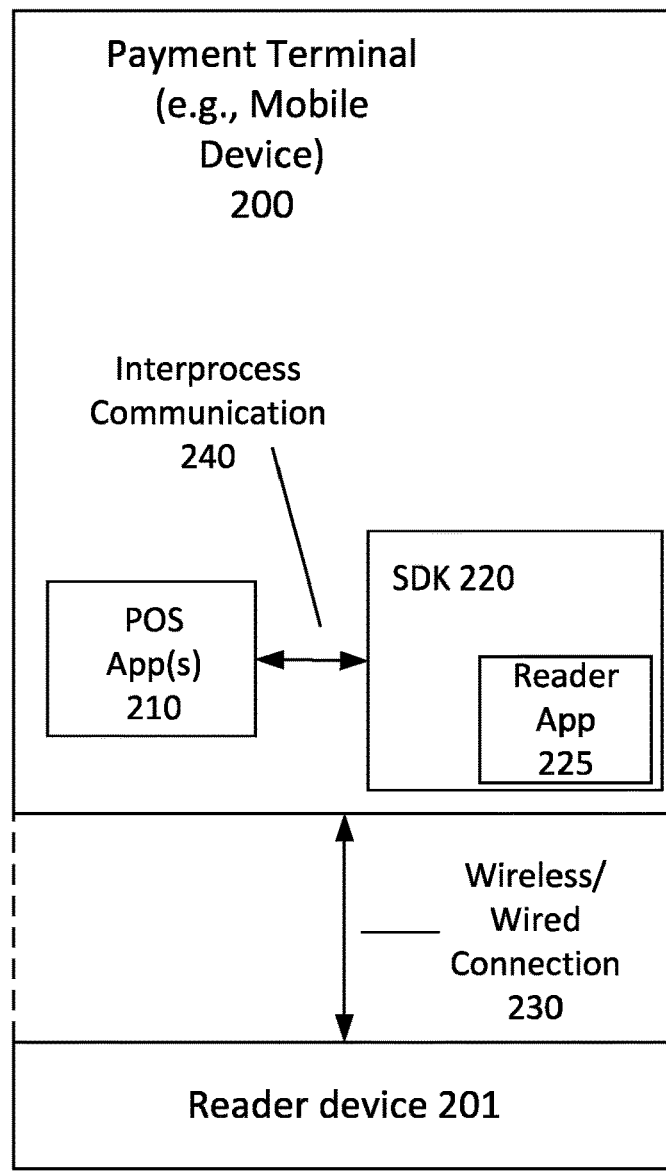
FIG. 2 is a block diagram of some embodiments of a payment terminal.

FIG. 2 is a block diagram of some embodiments of a payment terminal. In some embodiments, the payment terminal comprises a mobile device that operates as a mobile reader device to perform commerce transactions with payment cards. In some embodiments, the reader device reads payment cards as part of performing commerce transactions and may be part of the payment terminal or communicably coupled (via wireless or wired communication) to the payment terminal.

Referring to FIG. 2, the payment terminal 200 performs commerce transactions with a payment card using software executing on hardware (e.g., processors) installed and/or stored on the payment terminal 200. The software includes applications, such as POS application(s) 210, and an SDK 220. The POS application(s) 210 and the SDK 220 operate together to perform commerce transactions. In some embodiments, the SDK 220 includes a reader application 225 that controls operations of a reader device 201 that can be part of the payment terminal 200 or separate from, but communicably coupled to, the payment terminal 200.

POS application(s) 210 include applications and/or other software that perform portions of the commerce platform transactions except handling of the payment processing (e.g., capturing payment card information) for such transactions. In some embodiments, POS application(s) 210 take customer orders, present a virtual shopping cart or checkout functionality, check on inventory, enroll customers in loyalty programs and collect customer reviews.

The SDK 220 provides software for operating reader device 201, and provides functions for use by POS applications 210, and application program interface(s) for communicating with merchant server(s) 140, and one or more sets of APIs executing on commerce platform server(s) 150. In some embodiments, SDK 220 and the APIs are software packages, libraries, functions, routines, etc. generated and distributed by commerce platform servers 150 for seamlessly implementing financial transaction operations using the services of the commerce platform servers 150 in order to complete transactions. In some embodiments, the SDK 220 implements the logic for taking an encrypted payment method and interfacing with the backend commerce platforms for collection of funds. In some embodiments, the SDK 220 is integrated with POS application(s) 210 and compiled into the processing base of the POS application(s) 210.

In some embodiments, when performing a transaction, the SDK 220 operates in an isolated execution environment not accessible to the third-party applications 210 when handling financial transaction interactions with the commerce platform. For example, in some embodiments, the isolated execution environment may be executed by a trusted execution environment of a processor of the payment terminal 200, where the trusted execution environment ensures security, isolation, and confidentiality from other components of the payment terminal 200. That is, the use of the isolated execution environment does not expose or retain data (e.g., customer card data) processed within the isolated execution environment, as if it was processed on a different device. As discussed herein, by not allowing the payment terminal 200 access to card data of a customer, the techniques discussed herein prevent PCI compliance requirements being placed on the POS application(s) 210 or merchant server(s) 240.

The reader application 225 is part of the SDK 220 and is responsible for card presentation and processing of payments. In some embodiments, the reader application 225 leverages payment processing APIs to support in-person checkouts performed by payment terminal 200. In some embodiments, the reader application 225 is invoked by SDK 220. In some embodiments, SDK 220 provides information to reader application 225 when a payment card reading and capture is to occur.

Reader device 201 can be used to capture card data during a transaction between a merchant and a customer. One of the POS application(s) 240 on the payment terminal 200 creates a transaction and transmits an instruction to the reader device 201 via the SDK 220 and the reader application 225 to capture card data for a transaction.

In some embodiments, POS application(s) 210 perform a handoff to the SDK 220, which hands off to reader application 225, for payment collection. That is, when a payment is to be collected in response to a transaction being performed by POS application(s) 210, the SDK 220 notifies the reader application 225 which captures payment card data using the reader device 201. For example, when the POS application(s) 210 takes an order such as by using a virtual shopping cart or other POS functionality, the POS application(s) 210 hands control off to the SDK 220 and the reader application 225 to handle the payment processing. In some embodiments, the POS application(s) 210 receive a request from a user to conduct a transaction, and in response to that request, transitions control from the POS application(s) 210 to the SDK 220 and the reader application 225 running on the payment terminal 220 to collect the payment for the transaction being processed by the POS application(s) 210. In some embodiments, the SDK 220 receives the request from the user to conduct a transaction in response to the user pressing a button or exercising another graphical user interface (GUI) element on a display of the payment terminal 200.

Thereafter, the reader application 225, along with the SDK 220, process the payment for the transaction using payment card data received directly from that user using the card reader 201. Once the payment has been processed, the reader application 225 and the SDK 220 transition control back to the POS application(s) 210. In some embodiments, this transition may be part of sending an indication or other notification from the SDK 220 to the POS application(s) 210 indicating that the results (e.g., approved, denied, etc.) of processing the payment by the reader application 225 and the SDK 220.

In some embodiments, the communication between POS application(s) 210 and the SDK 220 is performed using an interprocess communication channel 240. In some embodiments, the interprocess communication channel includes an Android AIDL interprocess communication channel. In some embodiments, the interprocess communication channel 240 is used by an application, such as POS application(s) 210 running in the foreground to send communications to an application, such as, for example, reader application 225, running in the background. In some embodiments, this communication is performed transparently to operations being performed by the applications such as, for example, card reading by the reader device 201.

In some embodiments, POS application(s) 210 uses the interprocess communication channel 240 to make requests to SDK 220 and/or reader application 225. In some embodiments, each of these requests can result in a handoff between POS application(s) 210 and SDK 220 and/or reader application 225. In some embodiments, this interprocess communication channel 240 is designed to transfer requests from the POS application(s) 210 to a server (e.g., an AIDL server, etc.) running in the reader application 225 that receives and handles the request. In some embodiments, the request is limited to handling payment processing operations, while in some other embodiments, the reader application may perform other functions on behalf of the POS application(s) 210. In some embodiments, the requests are made using standard Java function calls.

In some embodiments, the interprocess communication channel 240 can be set up in response to a discovery process performed by the POS application(s) 210 to discover the presence of the reader device 201. For example, in some embodiments, the POS application(s) 210 makes a connect call through the SDK 220 to the reader device 201, and the result of the connect call is that the interprocess communication channel 240 is set up between the POS application(s) 210 and the SDK 220 and the reader application 225 for exchanging information.

In some embodiments, the interprocess communication channel 240 can be used to transfer a request from the reader application 225 to the POS application(s) 210. The request from the reader application 225 to the POS application(s) 210 can be made by the POS application(s) 210 registering a call back with an API of the reader application 225 or the SDK 220. Such a request can be used to obtain payment metadata that the POS application(s) 210 has and which is going to be used by the reader application 225 as part of the payment processing process.

In some alternative embodiments, instead of an interprocess communication channel, the POS application(s) 210 uses broadcasts to broadcast a message between the POS application(s) 210 and the SDK 220 to communicate requests for the reader application 225 to process payments. In yet other alternative embodiments, the communication between the POS application(s) 210 and SDK 220 are performed using requests to the commerce platforms or other network communications that occur over the wide area network (e.g., the Internet).

In some embodiments, prior to setting up the interprocess communication channel 240, the POS application(s) 210 will verify the identity of the reader device 201. In some embodiments, the POS application(s) 210 will verify the identity of reader device 201 based on key information that is stored on payment terminal 200. In some embodiments, the verification is based on review of digitally signed information regarding the reader device 201 that is obtained by the POS application(s) 210 and compared with information from the reader device 201.

In some embodiments, interprocess communication channel 240 is used to exchange customization information between the POS application(s) 210 and the SDK 220. In some embodiments, the customization information comprises information specifying a look and feel (e.g., theme, color scheme, etc.) used by the POS application(s) 210 or are requested for use by the reader application 225 when performing payment collection operations that utilize the display screen of the payment terminal 200. This enables the payment processing user interface(s) to match those used by POS application(s) 210. The look and feel may include splash screens to display, colors used in the user interface screens, graphical user interface (GUI) elements of a user interface being displayed, audio clues and information, brightness of display screen, and one or more other visual elements.

In some embodiments, the customization information provided between the POS application(s) 210 and the SDK 220 is for customizing the payment processing flow performed by the SDK 220 and the reader application 225. For example, in some embodiments, the POS application(s) 210 can specify certain payment methods that are employed or may be utilized by customers of the merchant. In response to this information, the reader application 225 customizes its payment flow to incorporate those payment methods. For example, some of the POS application(s) 210 may employ tipping and submits customization information over interprocess communication channel 240 specifies that tipping will be included as part of the payment processing flow. In response to this, the reader application 225 provides user interface elements that enable a user to specify a tip as part of the payment processing performed by the reader application 225.

In some embodiments, after the interprocess communication channel 240 has been set up and any customization to the look and feel and payment processing flow used by the SDK 220 and the reader application 225 has been completed and/or updated, the SDK 220 and the reader application 225 can perform payment processing operations on behalf of the POS application(s) 210.

In some embodiments, the payment terminal 200 executes the POS application(s) 210 and commercial transactions can be performed. In some embodiments, the payment terminal 200 performs token-based transactions as mentioned above. In such a case, the SDK 220 receives input from a user using the POS application(s) 210 that specifies the transaction amount, and the SDK 220 constructs a payment intent object. In some embodiments, the payment intent object is a data structure, data object, etc. defined by the SDK 220 that holds data including at least the transaction amount and merchant identifiers. In some embodiments, the reader device 201 is activated by the SDK 220 in response to receipt of the request from one or more of the POS application(s) 210 running on payment terminal 200 including the payment intent object, and card data of the customer is captured by a card data reader of the reader device 201, which is attached to the payment intent object by the reader application 225 running on the payment terminal 200.

The reader application 225 encrypts the captured card data using an encryption key and transfers the encrypted card data to the commerce platform server(s) 250, in a request that the transaction be authorized in the requested amount as specified by the payment intent object. In some embodiments, responsive to a merchant's customer confirming the payment amount, the payment intent object is transmitted to the commerce platform server(s) 250 by SDK 220. The commerce platform server(s) 250 decrypts the card data and clears the transaction with one or more authorization server(s) (e.g., card brand and issuing bank server(s)). When the transaction is cleared, a return authorization is generated by commerce platform server(s) 250 and transmitted to SDK 220, in the form of a token (e.g., a unique identifier).

In some embodiments, the SDK 220 receives the token authorizing the transaction and decrypts the token to obtain an authorization code, an authorized amount, time, location, last four digits of card charged, as well as other transaction data that can be provided to the customer in a transaction receipt. Furthermore, the SDK 220 may further proxy a request via merchant server(s) 240 to commerce platform server(s) 250 to determine that the token corresponds to a transaction that has been posted (e.g., funds and card data have been successfully captured by commerce platform server(s)).

In some embodiments, the series of communications exchanged during a transaction are not only for completing a transaction, but also for ensuring cardholder security at each step of the communication exchange. For example, cardholder data is encrypted before leaving the reader device 201 to the commerce platform server(s) 250, and further tokens authorizing transactions are also encrypted before being sent to the payment terminal 200 using a different transaction key. Additionally, customer card data is not provided to devices of the merchant at any time to prevent the merchant from being subject to PCI compliance requirements.

Thus, in some embodiments, payment terminal 200 performs tokenized transaction that are completed via communications between the SDK 220 and the commerce platform server(s) 250, where all sensitive customer information captured and encrypted by the reader device 201 is handled within the isolated execution environment used by the SDK 220, and where customer information is never exposed to the POS application(s) 210 of payment terminal in unencrypted form, thereby insulating the systems from PCI compliance requirements.

After approval, the SDK 220 sends a notification to the POS application(s) 210 indicating approval of the transaction, provide a customer with a receipt, complete the transaction, and seek remuneration by the merchant server(s).

In some embodiments, the SDK 220 also monitors the operation of POS application(s) 210 and returns status information back to commerce platform server(s) 150. The status information can include application logs and other information. In some embodiments, the information enables commerce platform server(s) 150 to determine that an application is in a crash loop or other undesired state. For example, POS application(s) 210 may have a number of permission violations. In some embodiments, in response to determining that an application is not functioning correctly or in a desirable way, commerce platform server(s) 150 can notify the SDK 220 and the POS application(s) 210 can be blacklisted from making any further transactions. In some embodiments, the POS application(s) 210 can be blacklisted by preventing the POS application(s) 210 from make future transactions and/or ban the payment terminal from making transactions with an API of the commerce platform server(s) 150 (e.g., an API of the payment processor). In alternative embodiments, portions of POS application(s) 210 are disabled. For example, if POS application(s) 210 attempts to provide a user interface in which a user would enter PIN or PAN data, then this POS application(s) 210 can be disabled to prevent such user interface pages from being displayed and/or used.

Figure 3A:
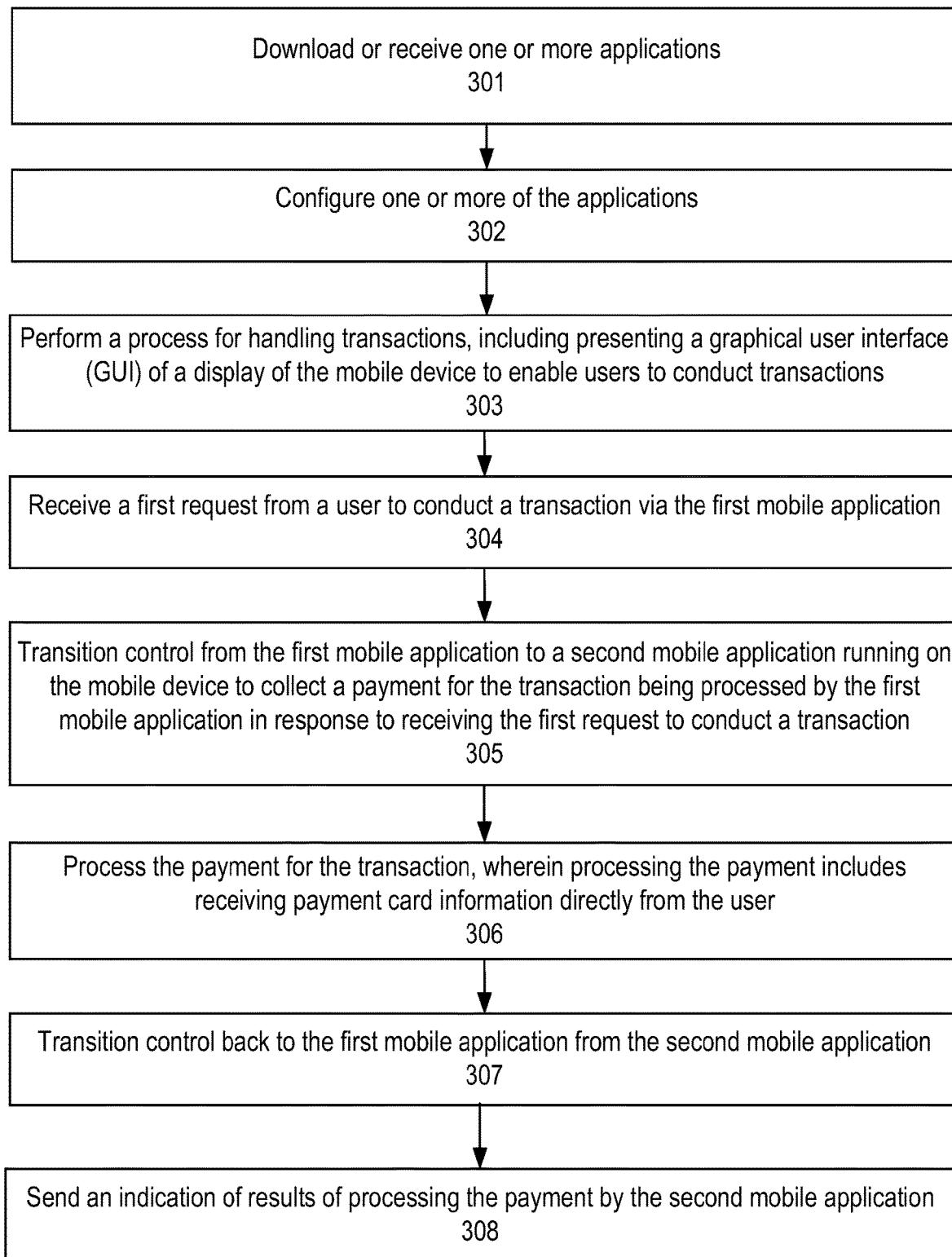
FIG. 3A illustrates some other embodiments of a method for conducting a transaction.

FIG. 3A illustrates some other embodiments of a method for conducting a transaction. The method can be performed by processing logic that may include hardware (circuitry, dedicated logic, etc.), software (such as is run on a general-purpose computer system or a dedicated machine), firmware, or a combination thereof. In some embodiments, the method is performed by a mobile device (e.g., a mobile phone, table or other portable computing device communicably coupled to a card reader, etc.).

Referring to FIG. 3A, processing logic downloads or receives multiple applications (processing block 301). In some embodiments, the applications are run on a mobile device (i.e. mobile applications). The applications can be downloaded wirelessly from a remotely located computer system (e.g., a server, data warehouse, etc.).

After downloading, processing logic configures one or more of the applications (processing block 302). In some embodiments, processing logic configures one of the applications based on another application. For example, in some embodiments, processing logic configures one application to match the look and feel (e.g., theme, color, user interface displays, graphical user interface (GUI) elements, etc.) used by another application. In some embodiments, the configuration is related to payment processing operations. For example, in some embodiments, when one of the application processes transactions, another application is configured to support the payment processing operations offered or accepted by the other application. For example, if one of the applications processes transactions that allows tipping, discounts, credits, coupons, etc., the other application can be configured to support payments in which these are involved. An example of such a process is described below in conjunction with FIG. 3B. Note that in some embodiments, processing logic does not perform configure any or all the applications and/or configures applications independent of the configuration of other applications.

With the applications on-board and any configuration of the applications completed, processing logic performs a process for handling transactions that include payments (processing block 303). In some embodiments, processing logic performs the process for handling transactions that include payments as part of running a first mobile application on a mobile device. In some embodiments, as part of performing the process for handling transactions, processing logic presents a graphical user interface (GUI) of a display of the mobile device to enable users to conduct transactions. In some embodiments, the GUI of first mobile application includes one or more GUI elements for order taking, inventory checking, a virtual shopping cart, customer loyalty information, customer rewards information, searching, signature elements, forms gathering user information such as, for example, email addresses, phone numbers, etc.

Subsequently, processing logic receives a first request from a user to conduct a transaction via the first mobile application (processing block 304). In some embodiments, the first request is received by the first mobile application. In some embodiments, the transaction comprises a commerce transaction and involves payment processing. In some embodiments, the first request can occur in response to the user interacting with a GUI element on a display screen of a mobile device. For example, the user may select a button or other input GUI element that signifies the user wants to proceed with and/or approves the transaction.

In response to receiving the first request, processing logic transitions control from the first mobile application to a second mobile application running on the mobile device to collect a payment for the transaction being processed by the first mobile application (processing block 305). In some embodiments, transitioning control from the first mobile application to the second mobile application to collect the payment for the transaction includes sending, via an inter process communication channel, a request to collect the payment. In some embodiments, the second mobile application runs a server that receives and processes the request.

In some embodiments, a software development kit (SDK) is integrated with the first mobile application, and transitioning control from the first mobile application to the second mobile application to collect the payment for the transaction includes passing control to the SDK and the SDK passing control to the second mobile application. In some embodiments, the second mobile application includes a reader application for controlling a card reader, and wherein the payment card comprises one of a credit card, a debit card, a charge card, a loyalty card, or a gift card.

Once control has transitioned to the second mobile application, processing logic processes the payment for the transaction (processing block 306). In some embodiments, the processing logic processes the payment using, or is under control of, the second mobile application. In some embodiments, as part of processing the payment, processing logic receives payment card information directly from the user that made the request to conduct a transaction.

After processing the payment, processing logic transitions control back to the first mobile application from the second mobile application (processing block 307) and sends an indication of results of processing the payment (processing block 308). In some embodiments, processing blocks 307 and 308 occur as part of the same operation and/or concurrently. In some embodiments, the processing logic transitions control back to the first mobile application and sends the indication of results of processing the payment using, or is under control of, the second mobile application.

As discussed above, in some embodiments, one or more of the third-party applications configures one or more other applications on the mobile device as part of a configuration process. In some embodiments, the configuration process occurs prior to the third-party application operating with one of the other applications. However, in some other embodiments, the configuration process can occur after the two applications have operated with one another. This post-operation configuration process can occur after one or more of the applications have been updated or received an update, particularly in cases where additional functionality has been added to one of the applications and configuration of the other application occurs to enable use or complement the use of the additional functionality.

In some embodiments, a third-party application configures these other applications after the applications have been transferred to the mobile device. These applications can be transferred to the mobile device by downloading them to the mobile via a wired or wireless connection. Alternatively, these applications can be transferred to the mobile device by coupling a memory device (e.g., Flash memory, memory stick, etc.) to the mobile device.

Figure 3B:
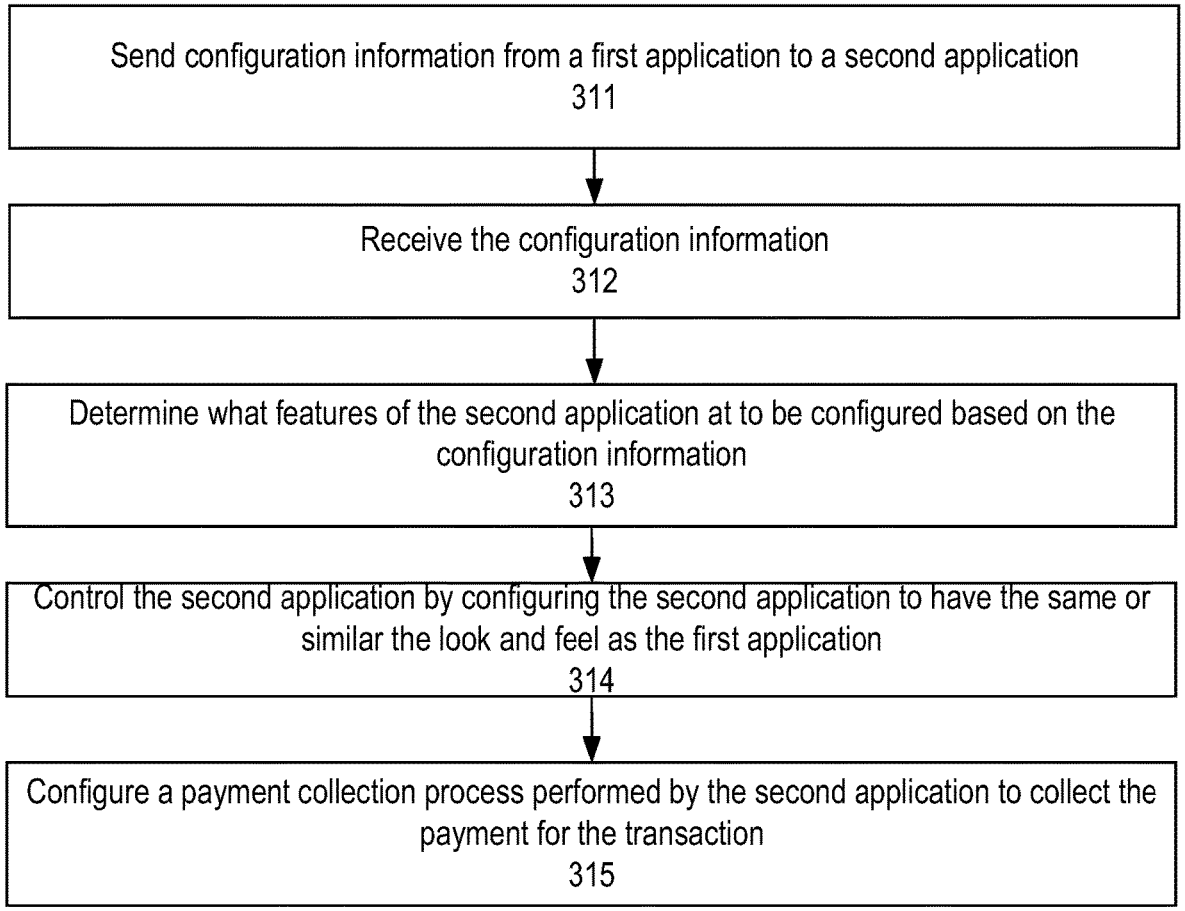
FIG. 3B illustrates some embodiments of a method for configuring an application.

FIG. 3B illustrates some embodiments of a method for configuring an application. The method can be performed by processing logic that may include hardware (circuitry, dedicated logic, etc.), software (such as is run on a general-purpose computer system or a dedicated machine), firmware, or a combination thereof.

Referring to FIG. 3B, the process begins by processing logic sending configuration information from a first application to a second application (processing block 311). In some embodiments, the first mobile application sends the configuration information via an inter process communication channel. In some embodiments, the configuration information comprises information that indicates the look and feel being used by the first application. In some embodiments, this information specifying the look and feel includes theme information indicative of a theme can be used by the application, color scheme, GUI elements, etc. In some embodiments, the configuration information is related to the process for handling transactions performed by the first mobile application, such as, but not limited to, features that the first application offers customers regarding payment processing options. These options can include a tipping option that allows customers to specify tips as part of the payment process, a discount option that allows customers to specify discounts as part of the payment process, a tipping option that allows customers to use coupons as part of the payment process, a tipping option that allows customers to specify codes that provide the customers with benefits as part of the payment process, etc. The configuration information can be used to configure other non-look-and-feel/non-payment processing features of the second application.

Processing logic receives the configuration information (processing logic 312) and determines what features of the second application at to be configured based on the configuration information (processing block 313). If the process determines the configuration is related to the look-and-feel of the first application, processing logic controls the second application by configuring the second application to have the same or similar look and feel as the first application (processing block 314). This allows the payment processing application to give the impression to the user that it is part of the first application. If the process determines the configuration information is related to the process for handling transactions performed by the first mobile application, processing logic controls the second application by using the configuration information to configure a payment collection process performed by the second application to collect the payment for the transaction (processing block 315).

In some embodiments, when the configuration information is related to the process for handling transactions performed by the first mobile application, the configuration information can include information specifying various payment options. If a tipping option is specified in the configuration information, such that a tipping option is included as part of transactions processed by the first mobile application, then the payment collection process of the second application to collect the payment for the transaction is configured or otherwise enabled by adding a GUI element to a user interface to be displayed on the display of the mobile device when collecting the payment to accept user input related to tipping in the transaction. Other payment collection options can be added and/or enabled using configuration information in this manner.

Security Signing of Applications for Payment Terminals

In some embodiments, prior to POS applications 210 being deployed on payment terminals, POS applications 210 are verified as secure and compliant. To that end, each of the applications is scanned, cryptographically signed, and then deployed for use in a payment terminal, such as payment terminal 200.

Figure 4A:
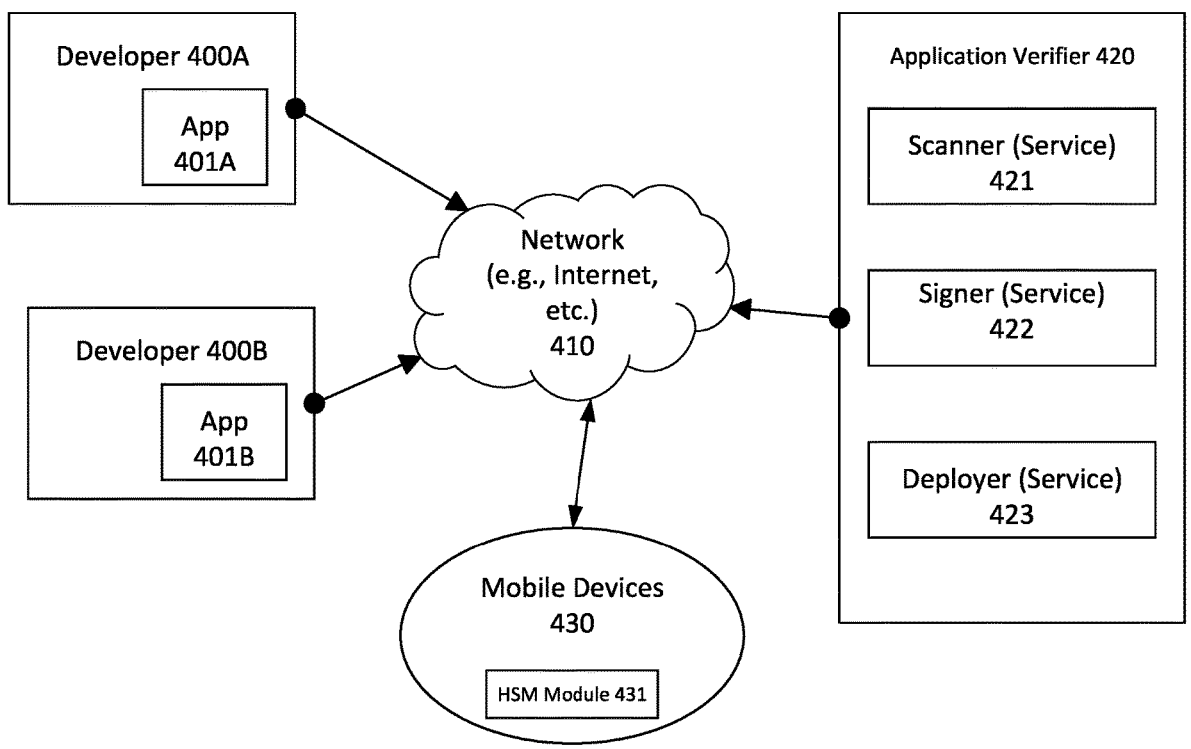
FIG. 4A illustrates a framework for performing security signing of applications.

FIG. 4A illustrates a framework for performing security signing of applications. Referring to FIG. 4A, the developers 400A and 400B develop applications, such as POS applications 401A and 401B, respectively, and send these applications to the application verifier 420 via the network 410. In some embodiments, the network 410 comprises the Internet. In some other embodiments, the network may be another wide area network or other local area network.

In response to receiving a POS application, the application verifier 420 performs scanning on the POS application using the scanning service 421 to ensure the application is not performing maliciously or perform operations they are not allowed as part of the process for performing commerce transactions. The operations that are not allowed can include, for example, attempting to access confidential or private information (e.g., payment card data, etc.) or handling information in a manner that does not comply with a compliance standard (e.g., sends information to unauthorized locations, etc.).

After scanning has been completed and the POS application is determined to be secure and compliant, the application verifier 420 also cryptographically signs each application. After signing service 422 cryptographically signs the applications, deployer service 423 enables the deployment of the application. In some embodiments, deployer service 423 deploys the POS application by sending the POS applications to payment terminals 430 (e.g., payment terminal 200). In some other embodiments, such payment terminals download the POS application from deployer service 423. This may be in response to notification sent to payment terminal 320 indicating that such an application is available for download. In other embodiments, payment terminal 430 determine that the POS applications are available and regularly download available applications at regular intervals.

More specifically, in some embodiments, the scanning service determines a POS application is secure and compliant by verifying the integrity of the POS application. To that end, scanning service 421 scans the application, such as applications 401A and 401B, to make sure there are no security threats and to determine whether the application acts maliciously. In some embodiments, scanning each application can include checking both configuration options as well as permissions that are granted by the application. These checks ensure that any configuration options or permissions granted by the application are checked and if they are not permitted for compliance or security reasons, the application will be rejected. For example, the scanning service 421 looks at user interface screens to make sure the POS application cannot gather data that they are not entitled to receive (e.g., to make sure a user cannot inject PAN data into any user interface screens, an application is granting access to a card reader on the payment terminal, such as for example, the reader device 201 of payment terminal 200, etc.), then the scanner service 421 can reject the application and not permit its downloading and/or use for conducting transactions in the commerce platform.

In some embodiments, determining whether the mobile application is secure and compliant comprises performing vulnerability scanning to determine if the mobile application is susceptible to malicious attacks, and includes performing vulnerability scanning by performing one or more of performing simulated operations including one or more password attacks, privileged access attacks, phishing attacks, SQL or other database injection attacks, manual application inspection, and code injection attacks.

In some embodiments, automatically scanning the mobile application to determine whether the mobile application is secure and compliant also includes performing operations to determine the mobile application is P2PE and PCI compliant.

In some embodiments, manual scanning is performed after the automatic scanning. The manual scan can include reviewing user interface screens to make sure they are P2PE and/or PCI compliant. Such a review can include ensuring that the user interface screens do not allow individuals to inject PAN or PIN data.

Based on the scanning performed by scanning service 421, a POS application is either approved or rejected. If the POS application is rejected, application verifier 420 will provide such an indication to the POS application's developer or merchant and can provide contextual information regarding why the POS application was rejected.

After approval, the POS application is sent to signing service 422 which takes in the applications and cryptographically signs the application. In some embodiments, multiple types of signing are performed on the application.

In some embodiments, PCI/PSPE signing and standard AOSP signing are used. These two levels of signing provide an extra layer of compliance certification that allow the POS application to be verified after downloading in two ways, using firmware to verify the first signature for the PCI compliance and using the operating system (OS) to verify the AOSP signature. In some embodiments, the signing service 422 uses merchant specific keys (e.g., unique keys for that merchant) for the signing. In some embodiments, the results of the cryptographic signing of the POS application is a certificate that accompanies the POS application when it is downloaded or otherwise deployed.

After signing, the application may be deployed using deployer service 423. Thus, the application may be placed in the deploy service domain to enable it to be deployed. In some embodiments, when the application is ready for deployment, the deploying service 423 sends a notification to alert the payment terminals, such as payment terminal 430, that the application is ready for deployment (e.g., download). In alternative embodiments, payment terminal 430 regularly checks to see if POS applications are ready for deployment by contacting the deploying service 423. In such a case, if the POS application is already available for deployment, payment terminal 430 may download the POS applications.

After a POS application is downloaded by a payment terminal such as payment terminal 430, the POS application is checked to ensure that the application has not been changed since the time it was cryptographically signed. This will protect against attacks where an individual attempts to modify the POS application after it has been scanned. By using keys stored in special hardware security modules on the mobile device, payment terminal 430 can check to verify the signature on the POS application. That is, the key handling is done using the hardware security module such as hardware security module 430 in FIG. 4A that maintains the keys. In some embodiments, the payment terminal 430 makes API calls to get the hardware security module 430 to perform cryptographic operations so that the verification can be made without allowing the keys to be accessed by the rest of the payment processing entity. In some embodiments, the payment terminal 430 performs two checks, an AOSP check and a P2PE firmware check that verifies the signature using firmware on mobile device to check its integrity and authenticity. If the application does not pass these checks, the SDK and/or reader application on the payment terminal will not permit the POS application to be run.

In some embodiments, if use of the application is to be revoked, the application verifier 420 can revoke the application signing certificates. In some embodiments, the application signing certificate can be revoked by invalidating the merchant keys that are specific to the merchant and their POS application. While the use of merchant-specific keys enables merchants to sign their own applications, the revocation of such keys does not impact other POS applications that are currently being used on a device.

Figure 4B:
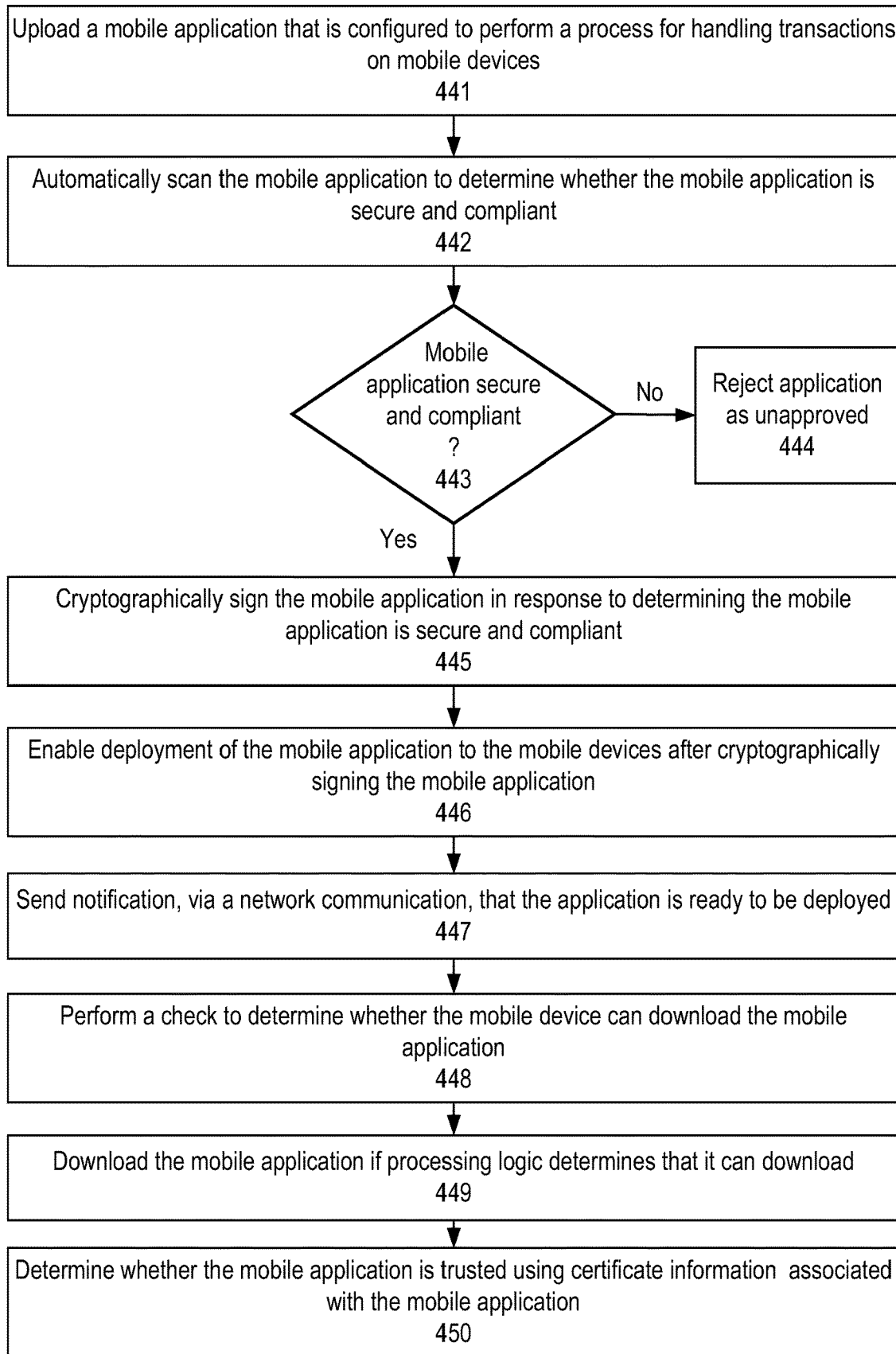
FIG. 4B illustrates some other embodiments of a process for conducting a transaction.

FIG. 4B illustrates some other embodiments of a process for conducting a transaction. The method can be performed by processing logic that may include hardware (circuitry, dedicated logic, etc.), software (such as is run on a general-purpose computer system or a dedicated machine), firmware, or a combination thereof. In some embodiments, the method is performed by a mobile device (e.g., a mobile phone, table or other portable computing device communicably coupled to a card reader, etc.).

Referring to FIG. 4B, the process begins by processing logic uploading a mobile application that performs a process for handling transactions when executed on mobile devices (processing block 441), and processing logic automatically scanning the mobile application to determine whether the mobile application is secure and compliant (e.g., compliant with established business practices, P2PE compliant, PCI, EMV (Europay, Mastercard, and Visa) standard, etc.) (processing block 442).

Processing logic tests whether the results of scanning indicate that the mobile application is secure and compliant (processing block 443). If processing logic determines that the application is not complaint or not secure, then processing logic rejects the application as unapproved (processing block 444). As part of the rejection, processing logic can provide a notification or other information to the developer or other user of the application indicating that the mobile application is not approved.

If processing logic determines that the application is complaint and secure, then the process transitions to processing block 445 where processing logic cryptographically signs the mobile application. In some embodiments, processing logic cryptographically signs the mobile application using a signing service. In some embodiments, cryptographically signing the mobile application, via the signing service, comprises signing the mobile application with a Payment Card Industry (PCI)/point-to-point encryption (P2PE) compliance certification and with an operating system (OS) level certification. In some embodiments, the OS level certification includes an Android Open-Source Project (AOSP) signature.

In some embodiments, the mobile application is associated with a merchant and cryptographically signing the mobile application via the signing service is performed with a merchant key associated with both the merchant and the mobile application, and further comprising invalidating the merchant key in order to disable the mobile application from being deployed successfully.

After cryptographically signing the mobile application, processing logic enables deployment of the mobile application to the mobile devices (processing block 446) and sends a notification, via a network communication, that the mobile application is ready to be deployed (processing block 447).

Subsequent to when the mobile application has been enabled for deployment, processing logic performs a check to determine whether the mobile device can download the mobile application (processing block 448) and downloads the mobile application if processing logic determines that it can download (processing block 448). In some embodiments, determining whether the mobile device can download the mobile application includes checking, by the mobile device, whether the certificate of the mobile application is on a list of certificates pre-installed on the mobile device, wherein downloading and running the mobile application occurs only in response to determining the certificate is on a list of certificates pre-installed on the mobile device.

Figure 4C:
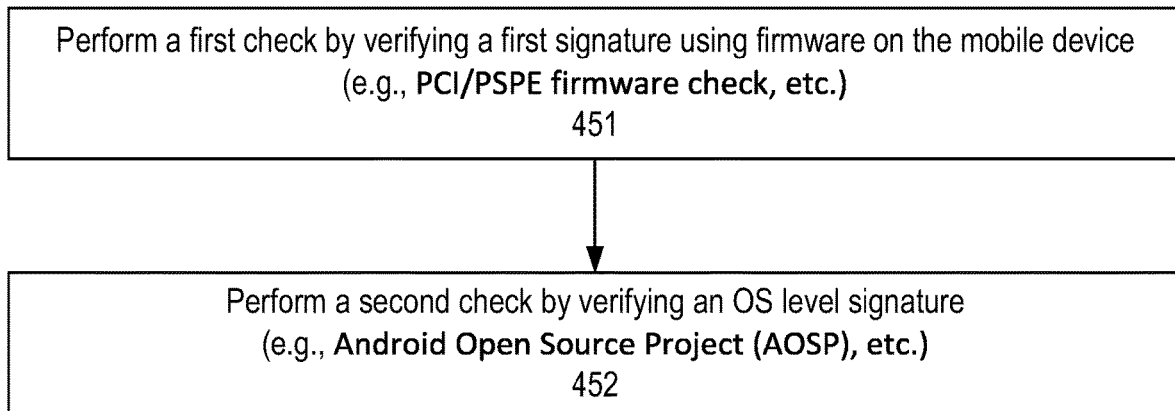
FIG. 4C is a flow diagram illustrating some embodiments of a process for determining that the mobile application is trusted.

In some embodiments, after downloading, processing logic determines whether the mobile application is trusted using certificate information of a certificate associated with the mobile application (processing block 449). In some embodiments, there is a signature or public key embedded in the certificate that may be used by some cryptographic operations to verify that the application being installed is trusted by the certificate. FIG. 4C is a flow diagram illustrating some embodiments of a process for determining that the mobile application is trusted. The method can be performed by processing logic that may include hardware (circuitry, dedicated logic, etc.), software (such as is run on a general-purpose computer system or a dedicated machine), firmware, or a combination thereof. In some embodiments, the method is performed by a mobile device (e.g., a mobile phone, table or other portable computing device communicably coupled to a card reader, etc.). Referring to FIG. 4C, the process includes processing logic performing a first check by verifying a first signature using firmware on the mobile device (processing block 451) and processing logic performing a second check by verifying an OS level signature (processing block 452). In some embodiments, the first check is an PCI/PSPE firmware check and the second check is an AOSP check.

If processing logic determines that the mobile application is not trusted, processing logic prevents the mobile application from being used (processing block 450). In some embodiments, in order to prevent its use, processing logic disables the mobile application. In some embodiments, processing logic causes the mobile application to be deleted from the mobile device if the mobile application is determined to be untrustworthy. Thereafter, the process ends.

If processing logic determines that the mobile application is trusted, processing logic, then processing logic runs the mobile application (processing block 451).

In some embodiments, the method of FIG. 4A further includes one or more of the operations of FIG. 3A. For example, in some embodiments, the method further includes executing, by the mobile device, the mobile application, including a process for handling transactions. While executing the mobile application, the method includes receiving, by the mobile application, a first request from a user to conduct a transaction via the mobile application and transitioning control from the mobile application to a second application running on the mobile device to collect a payment for the transaction being processed by mobile application in response to receiving the first request to conduct a transaction. The method includes processing logic processing, by the second application, the payment for the transaction, where processing the payment includes receiving payment card information entered directly by the user into a card reader, and then processing logic transitioning control back to the mobile application from the second application. This can occur as part of sending an indication of results of processing the payment by the second application.

Deployment of POS Applications to Payment Terminals with Readers

In some embodiments, the deployment or rollout of one or more of the POS applications to the payment terminals can be controlled. The POS applications can include new POS applications, updated versions of previously downloaded POS applications, or replacement versions of previously downloaded POS applications. The deployment can include an SDK of the payment terminal and/or the reader application for operating a reader device. In some embodiments, the reader application is part of the SDK. In some embodiments, developers of the application and/or their associated merchants can control the deployment of the POS applications. In some embodiments, the control is performed by using a set of application programming interfaces (APIs), which is described in further detail below.

In some embodiments, the control of the deployment is through the use of a deployment plan specified by the developers of the application and/or their associated merchants. The deployment plan can specify which payment terminals (e.g., mobile devices) are to receive which POS applications, which the locations and/or merchants locations (e.g., stores) having payment terminals are to receive POS application(s), the time period (e.g., over two weeks) during which the deployment is to take place, the type of payment terminals or readers that are part of a particular deployment, the percentage of a set of payment terminals that are to receive the POS application(s) (e.g., ten percent of a merchant's payment terminals), configuration or setting changes involved with one or more applications, including specific information about the POS applications (e.g., which POS application of a group is launched first and which is launched later, which application is in the background or foreground, etc.), etc. By using a deployment plan, a developer or merchant can employ a smaller beta deploy group for some stores, locations, etc., to test the operation of the POS applications, as part of a gradual rollout. Furthermore, the use of a deploy plan enables a developer or merchant to customize the rollout of the POS application(s) based on information corresponding to the different locations.

In some embodiments, the use of a deploy plan also allows a developer or merchant to alter or halt the deployment of one or more POS applications. In some embodiments, the deployment can be altered, halted or cancelled by the developer/merchant. This can be performed where the developer and/or merchant sees errors (e.g., a high error rate) in the operation of POS applications. In some embodiments, the stopping of a deployment is accomplished by withdrawing the deploy plan. In some other embodiments, the stopping of a deployment is accomplished by changing the deploy plan.

Figure 5:
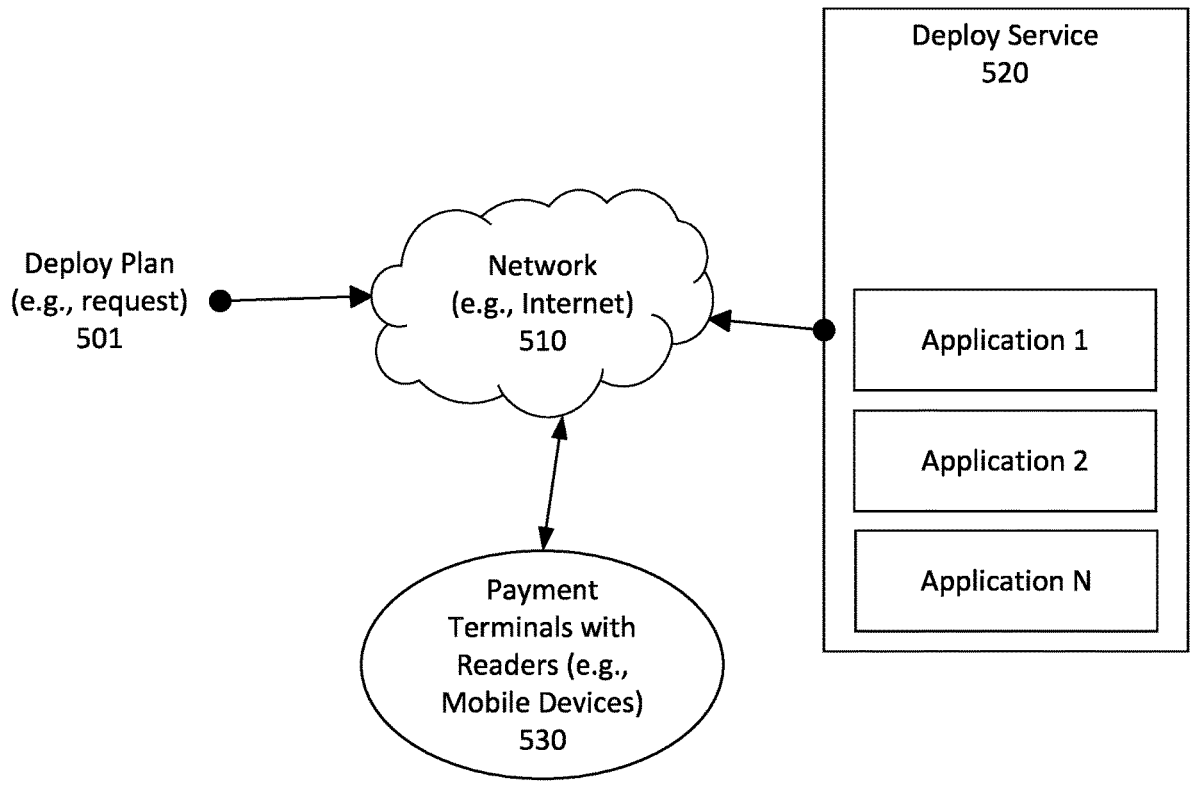
FIG. 5 illustrates some embodiments of a framework for deploying applications of a payment terminal.

FIG. 5 illustrates some embodiments of a framework for deploying applications of a payment terminal (e.g., a mobile device, computing device, etc.). Referring to FIG. 5, a deploy service 520 receives a deploy plan 501 via a network communication (e.g., Internet communications) and deploys one or more of applications 1-N to the payment terminals 530. In some embodiments, deploy service 520 can be performed by processing logic that may include hardware (circuitry, dedicated logic, etc.), software (such as is run on a general-purpose computer system or a dedicated machine), firmware, or a combination thereof.

The deploy plan 501 can be part of a request received over a network from a developer and/or merchant (e.g., via merchant server(s) 140). In some embodiments, deploy service 520 can be part of commerce platform server(s) 150. In some embodiments, the payment terminals 530 include or are coupled to one or more readers (e.g., card readers, etc.).

Figure 6A:
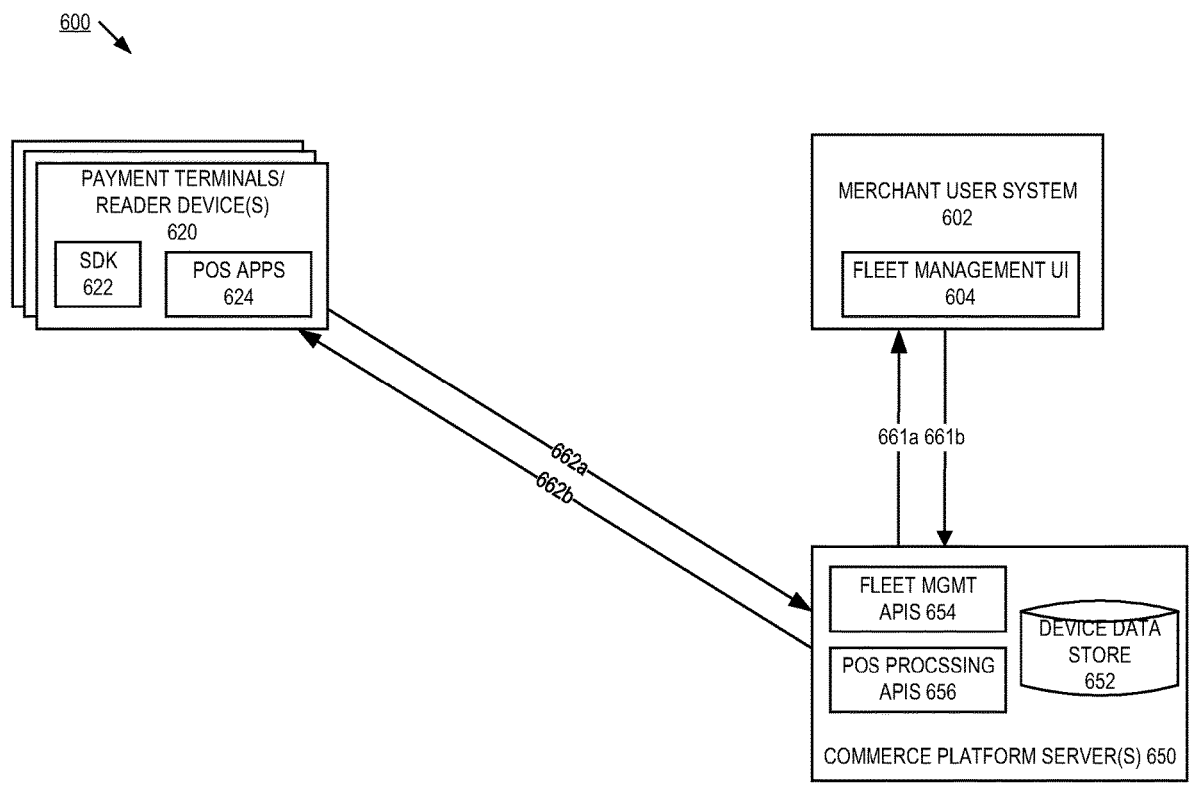
FIG. 6A illustrates some embodiments of a system architecture for performing fleet management of one or more payment terminals with reader devices.

FIG. 6A illustrates some embodiments 600 of a system architecture for performing fleet management of one or more payment terminals with reader device(s) 620 by a merchant user system 602 enabled by the commerce platform server(s) 650. The fleet management system is flexible and enables a user of the merchant, via merchant user system 602 (e.g., a desktop computer, tablet, mobile app, etc.), to remotely manage a plurality of payment terminals 620 (e.g., card reader devices and mobile reader devices at the same or different locations).

In some embodiments discussed above, there are several communications exchanged between the payment terminal(s) 620 and the merchant server(s) and the commerce platform server(s) 650. In some embodiments, device status reports may be included in one or more of those messages, or as separate periodic messages provided from the SDK 622 of payment terminal(s) 620 to the commerce platform server(s) 650. The device status reports can include, for example, application health, memory usage, power, network connectivity, device serial number, version of SDK, version of an OS running on the terminal device, as well as other information relevant to the health and functioning of the payment terminal(s) 620.

In some embodiments, the fleet management user interface 604 provides a web-based or application-based dashboard where a user can specify deploy plans for deploying one or more of POS applications 624. In some embodiments, fleet management APIs 654 receive such requests, and respond with data to populate the fleet management UI 604 as found in the device data store 652.

In some embodiments, a user of merchant user system 602 can deploy or enable deployment one or more of POS applications 624 onto payment terminals 620 simultaneously. Furthermore, a user of merchant user system 602 can deploy POS applications 624 on all payment terminals 620 associated with a merchant, even though the payment terminals 620 are at different locations, associated with different merchants controlled by the same organization, are different types of devices, are configured differently, etc. In some embodiments, a user of merchant user system 602 can deploy different sets of POS applications 624 on different ones of payment terminals 620. Thus, the deployment of granular and highly configurable remote management of payment terminals within a fleet of payment terminals is enabled by the commerce platform server(s) 650.

In some embodiments, the process for deploying one or more POS applications 624 is performed by processing logic of one or more payment terminal(s) (620), a merchant user system 602, and one or more commerce platform server(s) 650. The processing logic may comprise hardware (circuitry, dedicated logic, etc.), software (such as is run on a general-purpose computer system or a dedicated machine), firmware, or a combination for performing the operations discussed herein.

In one embodiment, at operation 661a, fleet management user interface 604 is a dashboard (e.g., web-based user interface, stand along dashboard application, etc.) by which a user can select and/or specify a deploy plan. Merchant user system 602 sends the deploy pan to the commerce platform server(s) 650 at operation 661b. As discussed above, the deploy plan can specify which payment terminal(s) 620 are to be configured with which of the POS applications 624. The specification can specify that payment terminals of specific locations are to be configured with a certain set of one or more of the POS applications 624. The deploy plan can specify one or more of the following: the payment terminals are to receive which POS applications, the locations and/or merchants stores having payment terminals that are receive POS application(s), a time period for the deployment (e.g., over two weeks), type of payment terminals or readers that are part of a particular deployment, a percentage of a set of payment terminals that are to receive the POS application(s) (e.g., 5 percent, ten percent, etc. of a merchant's payment terminals), configuration or setting changes for individual POS applications or other software, specific information about the POS applications (e.g., which POS application of a group is launched first and which is launched later, which application is in the background or foreground, etc.), etc.

In one embodiment, the fleet management APIs 654 of commerce platform server(s) 650 generates and transmits the configuration information including software updates as necessary to one or more of the payment terminal(s) (620) to update their set of POS applications 624 at operation 662a. In some embodiments, to obtain the POS applications as part of a deployment, individual payment terminals contact commerce platform server(s) 650 at regular intervals and provide their state. In response to this contact, commerce platform server(s) 650 determine what needs to be installed on that particular payment terminal and enables the payment terminal to download the software. In some alternative embodiments, commerce platform server(s) 650 determine that an update to a payment terminal's software is available and notify the payment terminal, which then subsequently checks for the update and downloads the POS applications.

In some embodiments, in response to the configuration information, SDK 620 updates the payment terminal 620 to implement the configuration. For example, SDK 620 can download the POS applications as well as cause their verification as described above.

In one embodiment, the SDK 622 then periodically provides status messages to the commerce platform server(s) 650 to update the status information related to performance of the POS applications 624 at operation 662b. By receiving this data, commerce platform server(s) 650 are able to determine that the POS applications 624 are operating correctly and provide the fleet management UI 604 with a current status of the payment terminal(s) (620) associated with a merchant in real time, or near real time, at varying levels of detail. Furthermore, from this information, a user of the merchant via the merchant user interface can use the information to, for example, monitor their operations and determine how other payment terminals should be configured with POS applications 624.

Figure 6B:
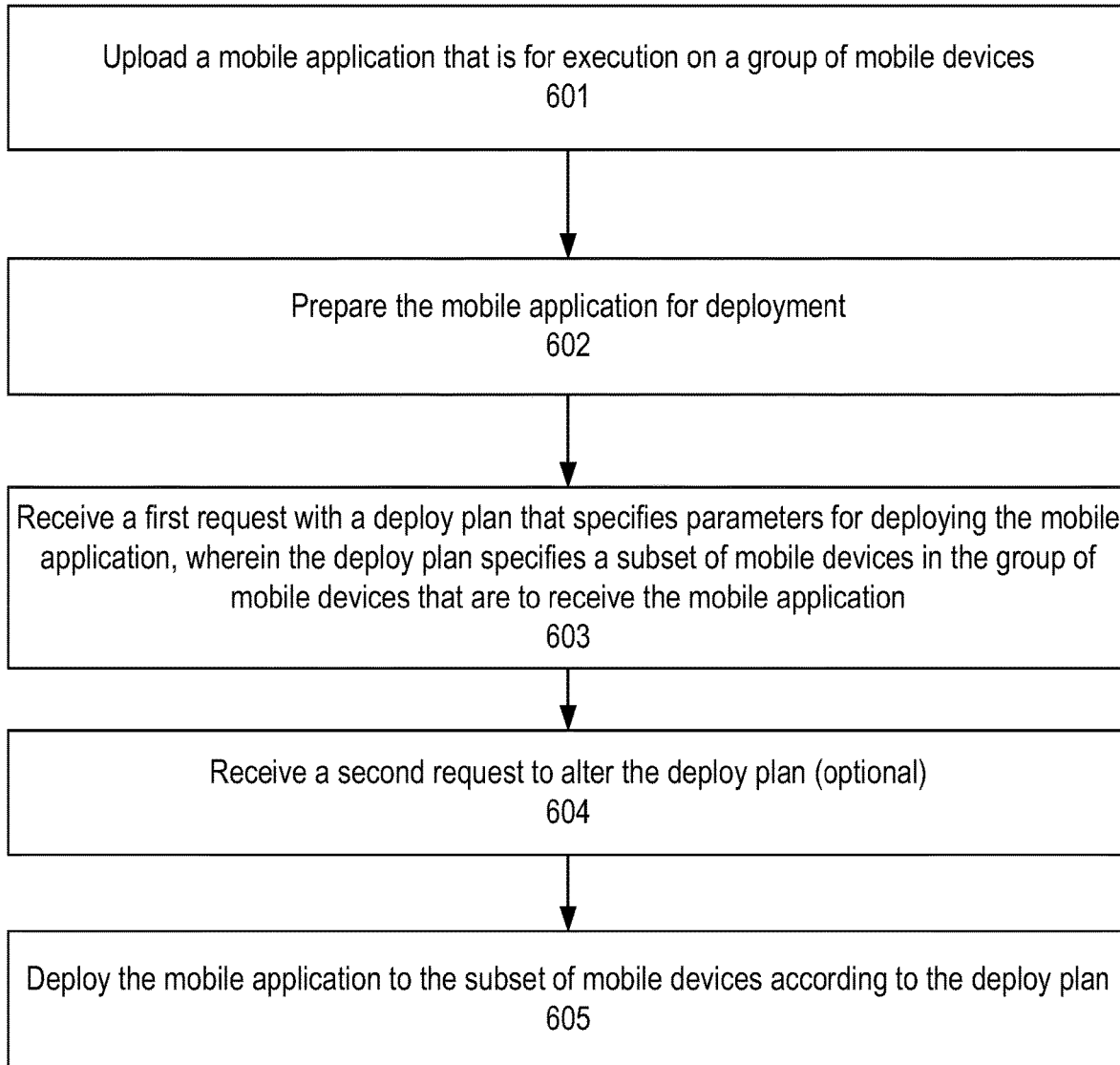
FIG. 6B illustrates some other embodiments of a process for deploying applications.

FIG. 6B illustrates some other embodiments of a process for deploying applications. The method can be performed by processing logic that may include hardware (circuitry, dedicated logic, etc.), software (such as is run on a general-purpose computer system or a dedicated machine), firmware, or a combination thereof. In some embodiments, the method is performed by a server or cluster of computing devices (e.g., computer system, computer nodes, servers, etc.).

Referring to FIG. 6B, the process begins by processing logic uploading a mobile application that is for execution on a group of mobile devices (processing block 601). In some embodiments, the mobile application includes a new version of a previously existing mobile application. In some other embodiments, the mobile application comprises the previously existing application with a configuration change. In yet some other embodiments, the mobile application comprises a new application.

In some embodiments, the mobile application performs transaction processing when executed on mobile devices in the group of mobile devices. In some embodiments, two or more mobile applications are set to be deployed, including a first application to execute, when running on a mobile device, a payment flow for processing transaction and a second reader application for handling payments for the payment flow.

After uploading the mobile application, in some embodiments, processing logic prepares the mobile application for deployment (processing block 602). In some embodiments, preparing the mobile application for deployment include scanning the mobile application to determine whether the mobile application is secure and compliant and cryptographically signing the mobile application in response to determining that the mobile application is secure and compliant. These operations can be performed as described above.

After the mobile application has been prepared for deployment, processing logic receives a first request with a deploy plan that specifies parameters for deploying the mobile application (processing block 603). In some embodiments, the deploy plan specifies a subset of mobile devices in the group of mobile devices that are to receive the mobile application. In some embodiments, receiving a first request with a deploy plan is via an application programming interface. In some embodiments, the subset of the group of mobile devices are related to each based on location or type. In some embodiments, the subsets of mobile devices comprise mobile terminals for use in processing payments for transactions.

In some embodiments, the deploy plan can specify one or more of the following: the payment terminals are to receive which POS applications, the locations and/or merchants stores having payment terminals that are receive POS application(s), a time period for the deployment (e.g., over two weeks), type of payment terminals or readers that are part of a particular deployment, a percentage of a set of payment terminals that are to receive the POS application(s) (e.g., 5 percent, ten percent, etc. of a merchant's payment terminals), configuration or setting changes for individual POS applications or other software, specific information about the POS applications (e.g., which POS application of a group is launched first and which is launched later, which application is in the background or foreground, etc.), etc.

Processing logic can receive a second request to alter the deploy plan (processing block 604). The deploy plan can be altered if the developer/merchant sees errors (e.g., a high error rate) in the operation of one or more of the POS applications being deployed. In some embodiments, the altering of the deploy plan results in a stopping of a deployment. In some embodiments, altering the deployment plan is accomplished by withdrawing the deploy plan.

Using the deploy plan, processing logic deploys the mobile application to the subset of mobile devices (according to the deploy plan) (processing block 605).

FIG. 7 is one embodiment of a computer system that may be used to support the systems and operations discussed herein. It will be apparent to those of ordinary skill in the art, however that other alternative systems of various system architectures may also be used.

The data processing system illustrated in FIG. 7 includes a bus or other internal communication means 715 for communicating information, and one or more processor(s) 710 coupled to the bus 715 for processing information. The system further includes a random-access memory (RAM) or other volatile storage device 750 (referred to as memory), coupled to bus 715 for storing information and instructions to be executed by processor(s) 710. Main memory 750 also may be used for storing temporary variables or other intermediate information during execution of instructions by processor(s) 710. The system also includes a read only memory (ROM) and/or static storage device 720 coupled to bus 715 for storing static information and instructions for processor(s) 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor(s) 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

Figure 8:
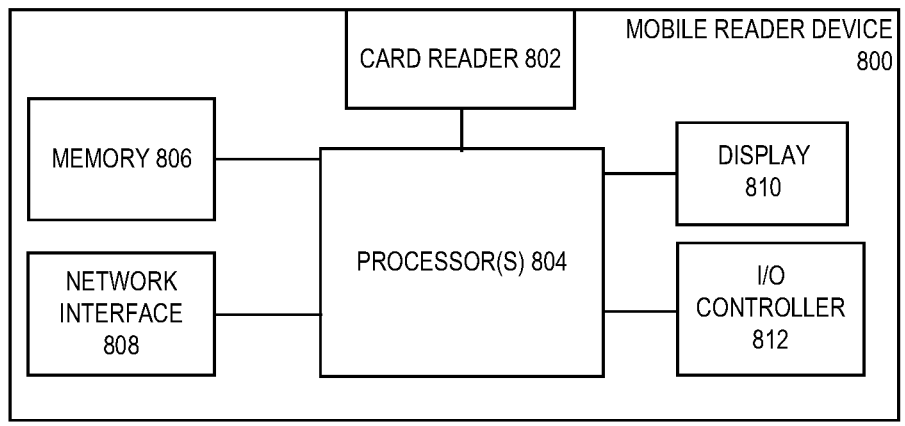
FIG. 8 is one embodiment of a mobile reader device that may be used to support the systems and operations discussed herein.

FIG. 8 is a block diagram of one embodiment of a mobile device with an NFC reader. In some embodiments, the mobile device 800 can include a combination of one or more processors 804, a memory 806, I/O controller 812, network interface 808, and display (e.g., display 810), in accordance with the illustration of FIG. 8. Each mobile device may also include a number of processing modules, which may be implemented as hardware, software, firmware, or a combination. It should be appreciated that the mobile device may also include, although not illustrated, a user interface (e.g., keyboard, touch-screen, buttons, or similar user input devices), a power device (e.g., a battery), as well as other components typically associated with electronic devices. Network interfaces of each reader device may also be coupled to a number of wireless subsystems (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems).

Memory 806 may be coupled to processor(s) in each reader device to store instructions for execution by processor(s) 804. In some embodiments, the memory is non-transitory. It should be appreciated that embodiments as described herein may be implemented through the execution of instructions, for example as stored in the memory (e.g., memory 806) or other element, by processor(s) 804 of the mobile device and/or another circuitry of the mobile device. Particularly, circuitry of the reader devices, including but not limited to processor and card reader, may operate under the control of a program, routine, or the execution of instructions to execute methods or processes in accordance with the embodiments described herein. For example, such a program may be implemented in firmware or software (e.g., stored in memory and/or other locations) and may be implemented by processors, such as processor and card reader, and/or other circuitry of the reader devices. Further, it should be appreciated that the terms processor, microprocessor, circuitry, controller, etc., may refer to any type of logic or circuitry capable of executing logic, commands, instructions, software, firmware, functionality and the like.

There are a number of example embodiments described herein.

Example 1 is a method comprising: performing, by a first mobile application running on a mobile device, a process for handling transactions, wherein the performing the process for handling transactions includes presenting a graphical user interface (GUI) of a display of the mobile device to enable users to conduct transactions; receiving, by the first mobile application, a first request from a user to conduct a transaction via the first mobile application; in response to receiving the first request, transitioning control from the first mobile application to a second mobile application running on the mobile device to collect a payment for the transaction being processed by the first mobile application in response to receiving the first request to conduct a transaction; processing, by the second mobile application, the payment for the transaction, wherein processing the payment includes receiving payment card information directly from the user; and transitioning control back to the first mobile application from the second mobile application as part of sending an indication of results of processing the payment by the second mobile application.

Example 2 is the method of example 1 that may optionally include that transitioning control from the first mobile application to the second mobile application to collect the payment for the transaction comprises sending, via an inter process communication channel, a request to collect the payment.

Example 3 is the method of example 2 that may optionally include that the second mobile application runs a server(s) that receives and processes the request.

Example 4 is the method of example 2 that may optionally include that a software development kit (SDK) is integrated with the first mobile application, and wherein transitioning control from the first mobile application to the second mobile application to collect the payment for the transaction comprises passing control to the SDK and the SDK passing control to the second mobile application.

Example 5 is the method of example 4 that may optionally include that the second mobile application comprises a reader application for controlling a card reader, and wherein the payment card comprises one of a credit card, a debit card, a charge card, a loyalty card, or a gift card.

Example 6 is the method of example 1 that may optionally include that the GUI of first mobile application includes one or more GUI elements for a virtual shopping cart, customer loyalty information, customer rewards information, customer information gathering, and searching.

Example 7 is the method of example 1 that may optionally include controlling, by the first mobile application, look and feel of the second mobile application.

Example 8 is the method of example 1 that may optionally include sending, by the first mobile application, to the second mobile application, configuration information related to the process for handling transactions performed by the first mobile application; and configuring, by the second mobile application, a payment collection process to collect the payment for the transaction based on the configuration information.

Example 9 is the method of example 8 that may optionally include that the configuration information includes information specifying that a tipping option is included as part of transactions processed by the first mobile application, and further wherein configuring the payment collection process to collect the payment for the transaction based on the configuration information comprises adding a GUI element to a user interface to be displayed on the display of the mobile device when collecting the payment to accept user input related to tipping in the transaction.

Example 10 is the method of example 8 that may optionally include that the first mobile application sends the configuration information via an inter process communication channel.

Example 11 is a mobile device for performing a transaction with a payment card, where the mobile device comprises: a display; a memory to store first and second mobile applications; a processor coupled to the memory, wherein the processor is configured to: run the first mobile application, the first mobile application executing a process for handling transactions, wherein the processor runs the process for handling transactions by presenting a graphical user interface (GUI) of a display of the mobile device to enable users to conduct transactions; receive a first request from a user to conduct a transaction via the first mobile application; transition control from the first mobile application to the second mobile application running on the mobile device to collect a payment for the transaction being processed by the first mobile application in response to receiving the first request to conduct a transaction; process the payment for the transaction using payment card information received directly from the user using a card reader; and transition control back to the first mobile application from the second mobile application as part of sending an indication of results of processing the payment by the second mobile application.

Example 12 is the mobile device of example 11 that may optionally include that the processor is configured to transition control from the first mobile application to the second mobile application to collect the payment for the transaction by sending, via an inter process communication channel, a request to collect the payment, and further wherein the second mobile application runs a server that receives and processes the request.

Example 13 is the mobile device of example 12 that may optionally include that a software development kit (SDK) is integrated with the first mobile application, and wherein transitioning control from the mobile application to the second mobile application to collect the payment for the transaction comprises passing control to the SDK and the SDK passing control to the second mobile application.

Example 14 is the mobile device of example 13 that may optionally include that the second mobile application comprises a reader application for controlling a card reader, and the payment card comprises one of a credit card, a debit card, a charge card, a loyalty card, or a gift card.

Example 15 is the mobile device of example 11 that may optionally include that the GUI of first mobile application includes one or more GUI elements for a virtual shopping cart, customer loyalty information, customer rewards information, and searching.

Example 16 is the mobile device of example 11 that may optionally include that the processor is configured to provide information associated with the first mobile application to control look and feel of the second mobile application.

Example 17 is the mobile device of example 11 that may optionally include that the processor is configured to: send configuration information to the second mobile application, the configuration information related to the process for handling transactions performed by the first mobile application; and configure a payment collection process of the second mobile application to collect the payment for the transaction based on the configuration information.

Example 18 is one or more non-transitory computer readable storage media having instructions stored thereupon which, when executed by a mobile device having at least a processor and a memory therein, cause the mobile device to perform operations comprising: performing, by a first mobile application running on a mobile device, a process for handling transactions, wherein the performing the process for handling transactions includes presenting a graphical user interface (GUI) of a display of the mobile device to enable users to conduct transactions; receiving, by the first mobile application, a first request from a user to conduct a transaction via the first mobile application; transitioning control from the first mobile application to a second mobile application running on the mobile device to collect a payment for the transaction being processed by the first mobile application in response to receiving the first request to conduct a transaction; processing, by the second mobile application, the payment for the transaction, wherein processing the payment includes receiving payment card information directly from the user; and transitioning control back to the first mobile application from the second mobile application as part of sending an indication of results of processing the payment by the second mobile application.

Example 19 is the one or more non-transitory computer readable storage media of example 18 that may optionally include that transitioning control from the first mobile application to the second mobile application to collect the payment for the transaction comprises sending, via an inter process communication channel, a request to collect the payment, and further wherein the second mobile application runs a server that receives and processes the request.

Example 20 is the one or more non-transitory computer readable storage media of example 19 that may optionally include that a software development kit (SDK) is integrated with the first mobile application, and wherein transitioning control from the mobile application to the second mobile application to collect the payment for the transaction comprises passing control to the SDK and the SDK passing control to the second mobile application.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in some embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. A method comprising:
   receiving, by a second application running on a mobile device via a first application running on the mobile device, a request from a user to authorize a transaction, the request comprising a transaction parameter entered by the user using the first application during the transaction, wherein the transaction parameter is used to authorize the transaction, and the request to authorize the transaction is sent from the first application to a server run by the second application via an inter process communication channel between the first application and the second application;

in response to the second application receiving the request to authorize the transaction, generating, by the second application, a data object comprising the transaction parameter and an identifier associated with the user, activating, by the second application, a reader device controlled by the second application to capture card data, the second application running in a trusted execution environment of the mobile device that isolates the second application and the reader device from applications and components of the mobile device outside of the trusted execution environment, the captured card data not exposed or accessible to applications and components outside of the trusted execution environment, and obtaining, by the second application, transaction metadata from the first application via the inter process communication;

attaching, by the second application, the card data to the data object;

transmitting, by the second application, an authorization request to a remote computer system to authorize the transaction based on the transaction parameter entered by the user, the authorization request transmitted to the remote computer system comprising an encrypted version of the data object generated by the second application encrypted using a first encryption key associated with the second application;

receiving, by the second application from the remote computer system, an encrypted token that authorizes the transaction after the remote computer system decrypts the data object and authorizes the transaction based on the transaction parameter and the card data;

decrypting, by the second application, the encrypted token encrypted by the remote computer system using a second encryption key associated with the remote computer system;

extracting, by the second application from the decrypted token, a set of authorization information generated by the remote computer system; and transmitting, by the second application to the first application via the inter process communication channel, the set of authorization information and the encrypted token causing the first application to authorize the transaction.

2. The method of claim 1, wherein a software development kit (SDK) is integrated with the second application, and wherein the request to authorize the transaction sent from the first application to the second application comprises configuration information that configures how the second application authorizes of the transaction.

3. The method of claim 2, wherein the second application comprises a card reader application for controlling the card reader, and wherein the card reader application activates the card reader to read one of a credit card, a debit card, a charge card, a loyalty card, or a gift card.

4. The method of claim 1, wherein the second application receives, via the inter process communication channel from the first application, configuration information associated with a selected set of attributes of the second application, the configuration information causing one or more second graphical user interface (GUI) elements rendered by the second application on a display of the mobile device to match a look and feel of one or more first application GUI elements.

5. The method of claim 1, further comprising:

receiving, by the second application from the first application, configuration information related to a process for handling transaction authorization requests initiated by the first application; and configuring, by the second application, a process for authorizing the transaction based on the configuration information.

6. The method of claim 5, wherein the second application receives the configuration information from the first application via the inter process communication channel.

7. A mobile device for performing user requests, the mobile device comprising:

a display;

a memory to store first and second mobile applications; and a processor coupled to the memory, wherein the processor is configured to:

receive, by a second application running on the mobile device via a first application running on the mobile device, a request from a user to authorize a transaction, the request comprising a transaction parameter entered by the user using the first application during the transaction, wherein the transaction parameter is used to authorize the transaction, and the request to authorize the transaction is sent from the first application to a server run by the second application via an inter process communication channel between the first application and the second application;

in response to the second application receiving the request to authorize the transaction, generate, by the second application, a data object comprising the transaction parameter and an identifier associated with the user, activate, by the second application, a reader device controlled by the second application to capture card data, the second application running in a trusted execution environment of the mobile device that isolates the second application and the reader device from applications and components of the mobile device outside of the trusted execution environment, the captured card data not exposed or accessible to applications and components outside of the trusted execution environment, and obtain, by the second application, transaction metadata from the first application via the inter process communication;

attach, by the second application, the card data to the data object;

transmit, by the second application, an authorization request to a remote computer system to authorize the transaction based on the transaction parameter entered by the user, the authorization request transmitted to the remote computer system comprising an encrypted version of the data object generated by the second application encrypted using a first encryption key associated with the second application;

receive, by the second application from the remote computer system, an encrypted token that authorizes the transaction after the remote computer system decrypts the data object and authorizes the transaction based on the transaction parameter and the card data;

decrypt, by the second application, the encrypted token encrypted by the remote computer system using a second encryption key associated with the remote computer system;

extract, by the second application from the decrypted token, a set of authorization information generated by the remote computer system; and transmit, by the second application to the first application via the inter process communication channel, the set of authorization information and the encrypted token causing the first application to authorize the transaction.

8. The mobile device of claim 7, wherein a software development kit (SDK) is integrated with the second application, and wherein the request to authorize the transaction sent from the first application to the second application comprises configuration information that configures how the second application authorizes of the transaction.

9. The mobile device of claim 8, wherein the second application comprises a card reader application for controlling the card reader, and wherein the card reader application activates the card reader to read one of a credit card, a debit card, a charge card, a loyalty card, or a gift card.

10. The mobile device of claim 7, wherein the second application receives, via the inter process communication channel from the first application, configuration information associated with a selected set of attributes of the second application, the configuration information causing one or more second graphical user interface (GUI) elements rendered by the second application on a display of the mobile device to match a look and feel of one or more first application GUI elements.

11. The mobile device of claim 7, wherein the processor is further configured to:

receive, by the second application from the first application, configuration information related to a process for handling transaction authorization requests initiated by the first application; and configure, by the second application, a process for authorizing the transaction based on the configuration information.

12. The mobile device of claim 11, wherein the second application receives the configuration information from the first application via the inter process communication channel.

13. A non-transitory computer readable storage media having instructions stored thereupon which, when executed by a mobile device having at least a processor and a memory therein, cause the mobile device to perform operations comprising:

receiving, by a second application running on the mobile device via a first application running on the mobile device, a request from a user to authorize a transaction, the request comprising a transaction parameter entered by the user using the first application during the transaction, wherein the transaction parameter is used to authorize the transaction, and the request to authorize the transaction is sent from the first application to a server run by the second application via an inter process communication channel between the first application and the second application;

in response to the second application receiving the request to authorize the transaction, generating, by the second application, a data object comprising the transaction parameter and an identifier associated with the user, activating, by the second application, a reader device controlled by the second application to capture card data, the second application running in a trusted execution environment of the mobile device that isolates the second application and the reader device from applications and components of the mobile device outside of the trusted execution environment, the captured card data not exposed or accessible to applications and components outside of the trusted execution environment, and obtaining, by the second application, transaction metadata from the first application via the inter process communication;

attaching, by the second application, the card data to the data object;

transmitting, by the second application, an authorization request to a remote computer system to authorize the transaction based on the transaction parameter entered by the user, the authorization request transmitted to the remote computer system comprising an encrypted version of the data object generated by the second application encrypted using a first encryption key associated with the second application;

receiving, by the second application from the remote computer system, an encrypted token that authorizes the transaction after the remote computer system decrypts the data object and authorizes the transaction based on the transaction parameter and the card data;

decrypting, by the second application, the encrypted token encrypted by the remote computer system using a second encryption key associated with the remote computer system;

extracting, by the second application from the decrypted token, a set of authorization information generated by the remote computer system; and transmitting, by the second application to the first application via the inter process communication channel, the set of authorization information and the encrypted token causing the first application to authorize the transaction.

14. The non-transitory computer readable storage media of claim 13, wherein a software development kit (SDK) is integrated with the second application, and wherein the request to authorize the transaction sent from the first application to the second application comprises configuration information that configures how the second application authorizes of the transaction.

15. The non-transitory computer readable storage media of claim 14, wherein the second application comprises a card reader application for controlling the card reader, and wherein the card reader application activates the card reader to read one of a credit card, a debit card, a charge card, a loyalty card, or a gift card.

16. The non-transitory computer readable storage media of claim 13, wherein the second application receives, via the inter process communication channel from the first application, configuration information associated with a selected set of attributes of the second application, the configuration information causing one or more second graphical user interface (GUI) elements rendered by the second application on a display of the mobile device to match a look and feel of one or more first application GUI elements.

17. The non-transitory computer readable storage media of claim 13, further comprising:

receiving, by the second application from the first application, configuration information related to a process for handling transaction authorization requests initiated by the first application; and configuring, by the second application, a process for authorizing the transaction based on the configuration information.

18. The non-transitory computer readable storage media of claim 17, wherein the second application receives the configuration information from the first application via the inter process communication channel.

* * * * *